Figure 1:
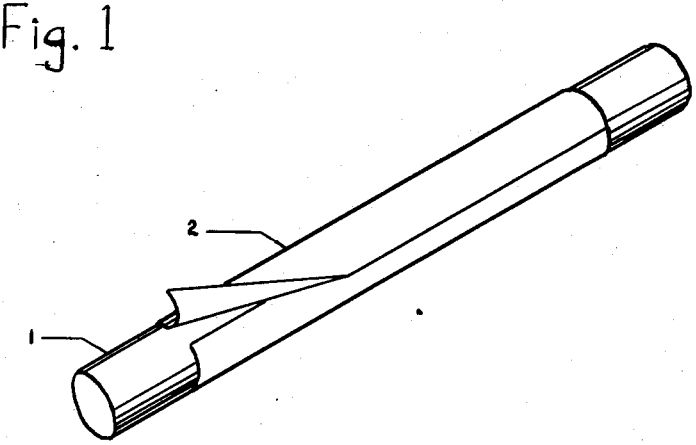

Nov. 17, 1959 F. W. TURNBULL 2,912,751
METHOD OF ENAMELING THE INTERIOR OF HOLLOW METAL BODIES
Filed April 26, 1954 2 Sheets-Sheet 1

INVENTOR
Frederick W Turnbull

Nov. 17, 1959 — F. W. TURNBULL — 2,912,751
METHOD OF ENAMELING THE INTERIOR OF HOLLOW METAL BODIES
Filed April 26, 1954 — 2 Sheets-Sheet 2

INVENTOR
Frederick W. Turnbull

United States Patent Office 2,912,751
Patented Nov. 17, 1959

2,912,751

METHOD OF ENAMELING THE INTERIOR OF HOLLOW METAL BODIES

Frederick W. Turnbull, Chevy Chase, Md.

Application April 26, 1954, Serial No. 425,575

6 Claims. (Cl. 29—527)

This invention relates to a method of lining pipe or tubing, or other hollow bodies made of metal, with a ceramic material of the type known as vitreous enamel, porcelain, enamel, or "glass." The term "enamel" will be used throughout the following specification and claims to indicate any of the materials of this general nature that are conventionally used to protect metal surfaces.

The practice has been to cover the interior surface of the article to be lined with finely divided enamel mixed with a liquid vehicle, dry out the liquid vehicle, and raise the temperature of the article and the adherent pulverant to the temperature of fusion of the pulverant. These steps to be repeated as necessary to provide an adequate thickness of coating and to eliminate "pin-holes" in the coating.

An object of the present invention is to provide a method of coating the interior of pipe and tubing that heretofore it has been impractical to coat interiorly, due to the small size of the pipe or tube.

A further object of the present invention is to provide a method of coating the interior of pipe of any size with a pin-hole free enamel coating.

A further object of the persent invention is to provide a method of producing a lining in a pipe that will include a layer of metal of higher corrosion resistance than the metal of the pipe.

A further object of the present invention is to provide a pipe or tube having a lining of enamel faced with metallic foil.

A further object of the present invention is to provide a method of lining a pipe with a laminated lining of enamel and foil.

While I specifically refer to pipe or tubing, I do not wish to be limited thereto in this application, as the hollow body to be lined may clearly be of any dimension or shape and might be used for many purposes such as boilers, tanks, etc.

Other and further objects of the present invention will appear in the following description which, taken with the attached drawings clearly and fully describes the present invention.

Figure 2:
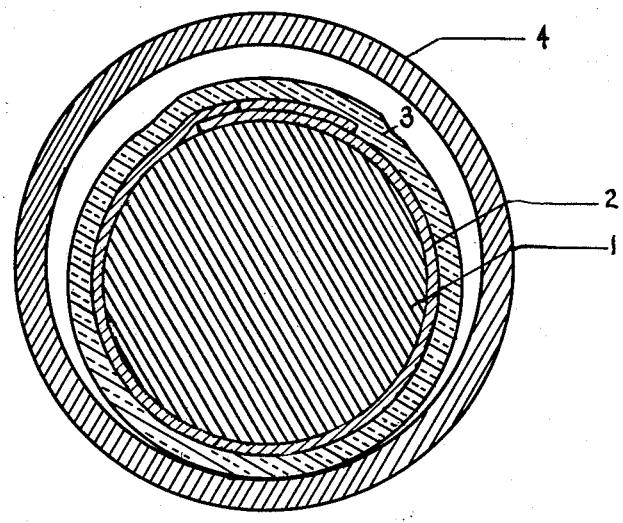
Figure 3:
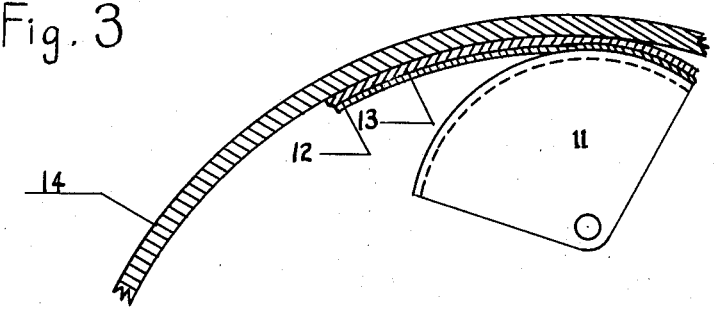
Figure 4:
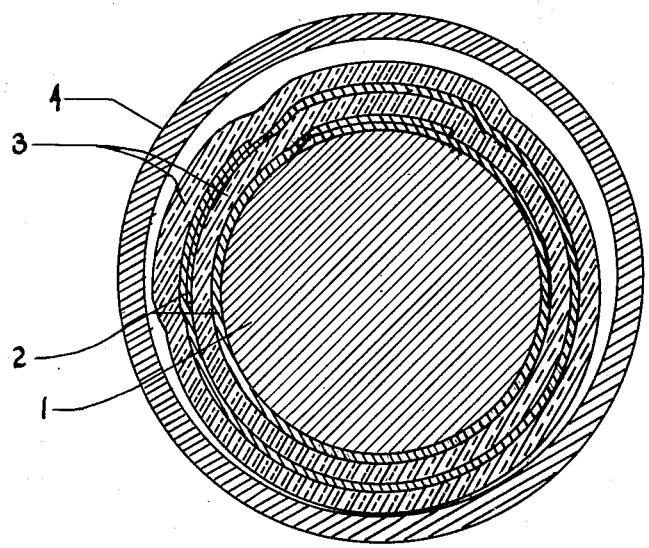
Figure 5:
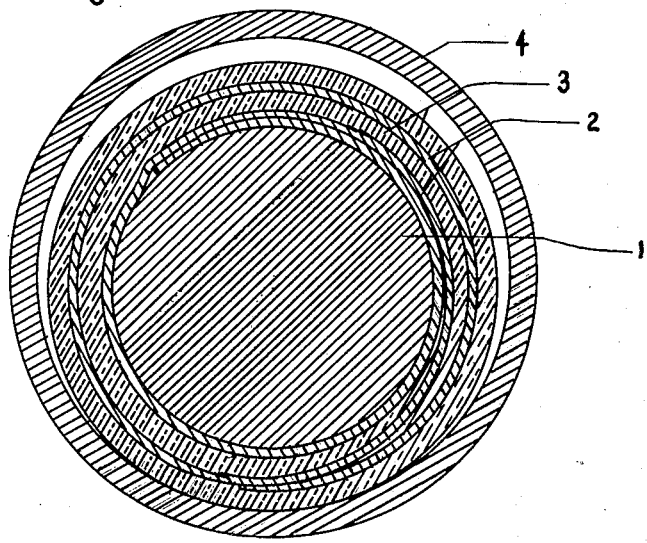

In the drawings, like reference characters refer to equivalent elements in the several views, and:

Figure 1 shows in perspective the first step in using the method of this invention to line a pipe or tube, Figure 2 shows in section the step of placing the lining in the tube prior to adhering it to the tube, Figure 3 shows in section a step in use of the method of this invention to line a tank or boiler, Figures 4 and 5 show variations of the assembly shown in sections similar to that of Figure 2.

The reason for coating the interior of pipe or other metal containers such as tanks and boilers is to protect the metal from the corrosive action of the contents of the pipe, or other container such as a plating tank.

As stated above, the methods at present in use for applying such coating or lining are awkward and unsatisfactory since the accessibility of the interior of the objects is negligible, and the pulverant material flowed in with a liquid vehicle may not adhere to the metallic surface, may be jarred off of the surface prior to firing, may include bubbles and so forth.

Referring now to Figure 1, there is shown a bar or mandrel 1 used in lining pipe or tube. A sheet of foil 2 is wrapped about the bar. Then the exterior of the wrapper is enameled. That is, the pulverant enamel is applied in any appropriate way and fired to produce the characteristic "glossy" enamel coating indicated in Figure 2 at 3. This coating, being accessible, as it is on the outside of bar 1, can be made free of pin-holes, or, if it is not, the condition can be easily remedied.

As seen in Figure 2, the bar 1 with wrapper 2 and enamel coating 3 is inserted into pipe 4 which is the object to be lined. The interior of pipe 4 has, of course, been previously prepared to receive an enamel lining in a manner known in the art. The assemblage of Figure 2 is then heated (in a furnace not shown) to a temperature at which the coating 3 is a viscous fluid. The pipe 4 is then sunk, preferably by cross rolling, onto the enamel coating on the foil supported by the bar 1. Any tube sinking mill may be used but it is preferred that a cross roll mill be used in order to roll out any gas inclusions. The mandrel is then withdrawn from the lined tube.

As seen in Figure 3, the same method may be used to coat the interior of a tank or boiler. Figure 3 shows also that the method may be used progressively.

A support or "mandrel" 11 is covered with a sheet of foil 12 and foil 12 is enameled as seen at 13. The "mandrel" with its covering 12, 13 is placed within the tank 14, the assemblage is heated and the "mandrel" is used to "roll" the enamel against the interior of the tank.

It will be noted that the curvature of the mandrel 11 is of less radius than the interior surface of tank 14 so that, after heating the "mandrel" is rocked and pressed against the tank, any gas inclusions which might otherwise occur will be eliminated. Successive areas of the interior of the tank may be similarly treated to complete the lining of the tank.

While I have described above one exemplification of the lining comprising a single sheet of foil and of enamel, the present invention also contemplates a lining of alternate layers of foil and enamel. Figure 4 shows a laminated liner of the type shown in Figure 2, and Figure 5 shows a laminated liner made by rolling an enameled sheet of foil several times about the bar 1. In using several separate foil layers as in Figure 4 the overlapping of foil, except for the first layer against the mandrel, should be reduced to a minimum and the overlap of these outer layers should be secured together with enamel. The liner used in Figure 3 may equally well be laminated.

The foil used in this method may, of course, be of any metal that will withstand the heat. Precious metals such as gold or platinum could, of course, be used but, except in very unusual instances, the excessive cost would not be warranted. Stainless steels, Monel metal, etc. would generally be commercially suitable especially for use in the laminated liners. Silver or copper could also be used but are considered less desirable than the other metals mentioned.

After the mandrel 1, or 11 has been removed, the lined tube or container is left with a layer of metal foil on the inside. The overlapped part of the foil which lay against the mandrel in Figures 2, 4 and 5 may be easily removed by brushing out. The remainder of the metal exposed on the inside of the container may be removed by abrasion, acid, amalgamation, or any other simple process according to the foil being used; or the foil lining may be left in place.

In regard to the laminated liners, it will be apparent that a pin hole occurring that extends entirely through such a liner will be impossible, and a liner of exceptional corrosion resistance and durability is provided.

I therefore claim as my invention:

1. A method of lining a metal tube with an adherent coating of ceramic material comprising the steps of covering a mandrel with a sheet of foil, fusing a ceramic coating onto said foil, introducing the mandrel with its coated foil cover into the tube to be lined, heating the assemblage, sinking the tube progressively onto the coating, and thereafter removing the mandrel.

2. A method of lining a metal tube with an adherent vitreous coating of ceramic material comprising the steps of enameling a sheet of metal foil, wrapping the enameled foil, with the enameled side out, around a mandrel at least one convolution, inserting the mandrel with its wrapping of enameled foil into the tube to be lined, heating the assemblage, and sinking the tube progressively on the wrapping of enameled foil.

3. A method of lining a metal tube with an adherent laminated lining comprising at least one lamination of metal foil comprising the steps of wrapping a mandrel with a sheet of metal foil, enameling the foil on the mandrel, wrapping the assemblage with a second sheet of metal foil, enameling said second sheet of foil, inserting the mandrel and the enameled foil wrappers into the tube to be lined, heating the assemblage and progressively sinking the tube on the assemblage.

4. A method of placing an adherent ceramic lining in a metal tube or the like, comprising wrapping a mandrel in a sheet of metal so than as to be non-self-sustaining, coating said wrapping with a pulverant vitrifiable ceramic material, heating the mandrel, wrapper, and coating to vitrify said coating in order to make an impervious vitreous coating on said wrapper, cooling and inspecting said coating, assembling said coated wrapped mandrel in a tube to be lined, heating said assembly to the temperature necessary for vitrification, contracting said tube into contact with said assemblage to cause said vitreous ceramic material to adhere to said tube, removing said mandrel from within its wrapping, and thereafter removing said wrapping from within said vitreous material.

5. A method of lining a metal container with an adherent coating of glass-like ceramic material comprising covering a support having a curved face of less radius of curvature than the surface on which the lining is to be applied and of a lesser area than the interior of said container, covering said support with a layer of metallic foil, fusing a coating of the glass-like ceramic material to said metallic foil, heating an area of the wall of said container at least as large as the area of said support to a temperature substantially higher than the temperature of fusion of said glass-like ceramic material coating and pressing said coating by means of said support against the interior of said heated portion of said container with a rolling action to progressively adhere said coating carried by said foil against the interior surface of said container, and thereafter repeating the steps to cover other areas of the interior of said container.

6. A method of coating a metallic surface with a layer of enamel comprising progressively pressing a sheet of enamel coated metal foil, carried by means of a support having a curved surface contacting and supporting said foil, against the metallic surface in the presence of heat so that the enamel is progressively adhered to said metallic surface.

References Cited in the file of this patent
UNITED STATES PATENTS

| | | | |
|---|---|---|---|
| 14,929 | Puffer | May 20, | 1856 |
| 269,749 | Vollrath | Dec. 26, | 1882 |
| 438,072 | Everson | Oct. 7, | 1890 |
| 855,985 | Russell | June 4, | 1907 |
| 1,070,614 | Kraus | Aug. 19, | 1913 |
| 1,088,963 | Buch | Mar. 3, | 1914 |
| 1,512,961 | Weil | Oct. 28, | 1924 |
| 1,583,464 | Housekeeper | May 4, | 1926 |
| 1,871,125 | McGary | Aug. 9, | 1932 |
| 1,998,047 | Farr | Apr. 16, | 1935 |
| 2,002,415 | Otto | May 21, | 1935 |
| 2,198,149 | Bangert | Apr. 23, | 1940 |
| 2,219,434 | White | Oct. 29, | 1940 |
| 2,245,421 | Frankenburg | June 10, | 1941 |
| 2,371,348 | Murray | Mar. 13, | 1945 |
| 2,613,015 | Keating | Oct. 7, | 1952 |
| 2,656,949 | Leupold | Oct. 27, | 1953 |